US006979968B2

(12) United States Patent (10) Patent No.: US 6,979,968 B2
Nagashima et al. (45) Date of Patent: Dec. 27, 2005

(54) METHOD AND SYSTEM FOR MANAGING PROCESSOR EXECUTION TIME UTILIZING VARIABLE FREQUENCY SWITCHING

(75) Inventors: James M. Nagashima, Cerritos, CA (US); Thomas P. O'Meara, Redondo Beach, CA (US); Nitinkumar R. Patel, Cypress, CA (US); Steven E. Schulz, Torrance, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/676,529

(22) Filed: Oct. 1, 2003

(65) Prior Publication Data

US 2005/0073272 A1 Apr. 7, 2005

(51) Int. Cl.⁷ ................................................ H02P 3/00
(52) U.S. Cl. ...................... 318/268; 318/599; 318/461; 700/19
(58) Field of Search ................................ 318/800–822, 318/567, 727, 732, 767, 798, 799, 461; 702/75, 702/147, 145; 322/16, 29

(56) References Cited

U.S. PATENT DOCUMENTS

| | | | | |
|---|---|---|---|---|
| 4,847,555 A | * | 7/1989 | Stammer et al. | 324/161 |
| 4,880,474 A | * | 11/1989 | Koharagi et al. | 134/21 |
| 4,933,608 A | * | 6/1990 | Ohhama | 318/135 |
| 4,971,522 A | * | 11/1990 | Butlin | 417/18 |
| 4,983,895 A | * | 1/1991 | Koharagi et al. | 318/254 |
| 5,075,607 A | * | 12/1991 | Koharagi et al. | 318/254 |
| 5,166,585 A | * | 11/1992 | Koharagi et al. | 318/254 |
| 5,294,872 A | * | 3/1994 | Koharagi et al. | 318/254 |
| 5,298,840 A | * | 3/1994 | Yoshino et al. | 318/268 |
| 5,459,386 A | * | 10/1995 | Okachi et al. | 318/727 |
| 5,650,707 A | * | 7/1997 | Lipo et al. | 318/773 |
| 6,654,648 B2 | * | 11/2003 | Nada et al. | 700/19 |
| 6,708,134 B2 | * | 3/2004 | McGaughey et al. | 702/145 |
| 6,720,751 B2 | * | 4/2004 | Plasz et al. | 318/567 |
| 6,784,634 B2 | * | 8/2004 | Sweo | 318/727 |
| 2002/0039010 A1 | * | 4/2002 | Plasz et al. | 318/567 |
| 2003/0052643 A1 | * | 3/2003 | Sweo | 318/801 |
| 2003/0154041 A1 | * | 8/2003 | McGaughey et al. | 702/75 |
| 2004/0134698 A1 | * | 7/2004 | Yamamoto et al. | 180/65.2 |

* cited by examiner

*Primary Examiner*—Paul Ip
(74) *Attorney, Agent, or Firm*—Christopher DeVries

(57) ABSTRACT

The present invention includes a method for managing processor execution time in a motor controller. The method includes receiving motor speed data, comparing the received motor speed data to predetermined motor speed ranges, determining a motor speed range based on the comparison, and modulating an inverter switching frequency of the motor controller processor based on the motor speed range. The step of receiving motor speed data may include receiving machine terminal information, processing the received machine terminal information utilizing a sensorless control algorithm, and determining motor speed data based on the processed information. The step of modulating the inverter switching frequency may include determining a modified inverter switching frequency value based on the determined motor speed range and providing the modified inverter switching frequency value to a processor control algorithm. In one embodiment, the processor control algorithm modifies the inverter switching frequency based on the modified inverter switching frequency value.

9 Claims, 4 Drawing Sheets

METHOD AND SYSTEM FOR MANAGING PROCESSOR EXECUTION TIME UTILIZING VARIABLE FREQUENCY SWITCHING

TECHNICAL FIELD

The technical field of this disclosure is electric motor controllers, and more particularly, indirect field-oriented control utilizing a digital signal microprocessor.

BACKGROUND OF THE INVENTION

Hybrid and electric vehicles use variable speed motor drives to provide traction power. Conventional motor control in automotive traction applications includes indirect field-oriented control utilizing a digital signal microprocessor. The inclusion of position sensorless controls places additional demands on the processor to compute motor shaft position.

In a conventional motor control application, the processor has to estimate shaft position and compute the appropriate pulse-width modulation (PWM) signals to apply to the motor for torque production during each switching period of the main power inverter. Various methods exist to estimate shaft position. However, most of the methods for estimating shaft position are sensitive to the motor's rotor speed and are most accurate at either high rotor speed or low rotor speed. Typically, both a low rotor speed method and a high rotor speed method are utilized to achieve an accurate motor control application.

Unfortunately, use of both a low rotor speed method and a high rotor speed method can exceed available processor capabilities. Current solutions include replacing conventional processors with dual-processors or higher speed processors. These solutions are less than desirable due to an increase in per unit cost of the motor controller. It would be desirable, therefore, to provide a method and system that would overcome these and other disadvantages.

SUMMARY OF THE INVENTION

One aspect of the invention provides a method of managing processor execution time in a motor controller that includes receiving motor speed data, comparing the received motor speed data to predetermined motor speed ranges, determining a motor speed range based on the comparison, and modulating an inverter switching frequency of the motor controller processor based on the determined motor speed range.

In accordance with another aspect of the invention, a computer readable medium storing a computer program includes: computer readable code for comparing received motor speed data to predetermined motor speed ranges; computer readable code for determining a motor speed range based on the comparison; and computer readable code for modulating an inverter switching frequency of the motor control processor based on the determined motor speed range.

In accordance with yet another aspect of the invention, a system for managing processor execution time in a motor control is provided. The system includes means for receiving motor speed data. The system additionally includes means for comparing the received motor speed data to predetermined motor speed ranges. Means for determining a motor speed range based on the comparison is provided. Means for modulating an inverter switching frequency of the motor control processor based on the determined motor speed range is also provided.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices.

DETAILED DESCRIPTION OF THE PRESENTLY PREFERRED EMBODIMENT

Figure 1:
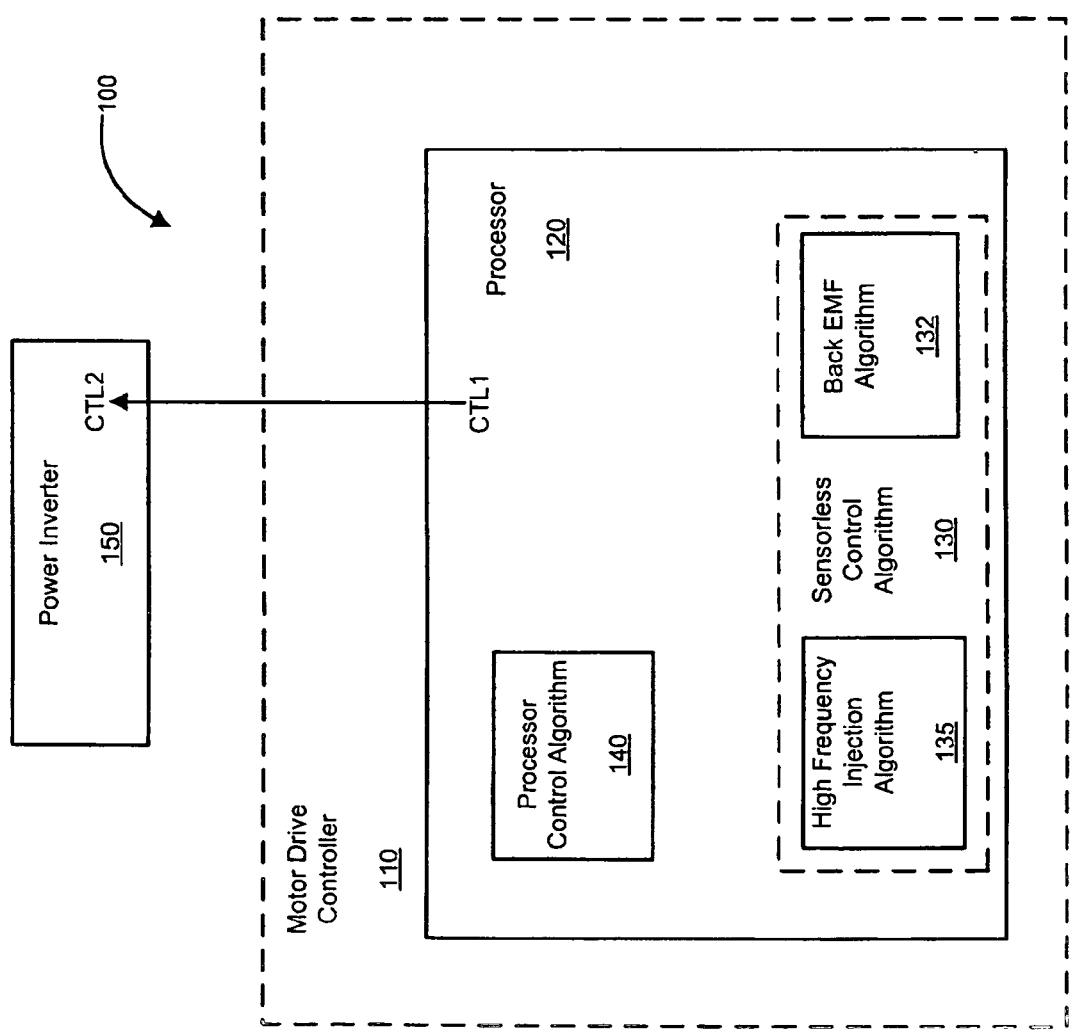
FIG. 1 is a block diagram illustrating a motor drive system, according to an embodiment of the present invention.

FIG. 1 is a block diagram illustrating a motor drive system 100 including motor drive controller 110 and power inverter 150. Controller 110 includes processor 120. Motor drive system 100 may include additional components not relevant to the present discussion.

Motor drive controller 110 is a composite assembly that provides motor control functions, such as, for example motor sensing, speed estimation, rotor location information, and motor drive control. Motor drive controller 110 is any suitable device capable of providing motor control functions. Motor drive controller 110 typically includes a microcontroller, a processor, a combination of a microcontroller and processor, software modules for performing motor control functions, and volatile or non-volatile memory. Motor drive controller 110 may include additional components not relevant to the present discussion.

Processor 120 produces a pulse-width modulated control signal that is applied to a power inverter 150. Processor 120 is coupled to motor drive controller 110. Processor 120 includes a control output terminal (CTL1). Processor 120 may include additional components or terminals not relevant to the present discussion. Processor 120 is capable of processing different algorithms at different clock rates, for example based on an inverter switching frequency. Processor 120 may be implemented as any suitable processor or digital signal processor, such as, for example a 40 megahertz (MH) Black Oak processor available from Motorola, Inc. of Schaumburg, Ill.

Sensorless control algorithm 130 is a software application that estimates rotor position during high-speed and low-speed operations. Sensorless control algorithm 130 is in communication with processor 120. Sensorless control algorithm 130 includes back electromotive force (EMF) algorithm 132 and high frequency injection (HFI) algorithm 135. Sensorless control algorithm 130 may additionally include other algorithms for estimating rotor position not listed. In one embodiment, sensorless control algorithm 130 is located within memory included in processor 120. In another embodiment, sensorless control algorithm 130 is located within memory located elsewhere within motor drive controller 110 circuitry. Sensorless control algorithm 130 allows processor 120 to compute motor shaft position at any speed using machine terminal information, such as, for example machine terminal voltage information or machine terminal current information.

Back electromotive force (EMF) algorithm 132 is a software application that estimates rotor position during high-speed operations. In one embodiment, back EMF algorithm 132 is located within memory included in processor 120. In another embodiment, back EMF algorithm 132 is located within memory located elsewhere within motor drive controller 110 circuitry. Back EMF algorithm 132 allows processor 120 to compute motor shaft position at high speeds using machine terminal information, such as, for example machine terminal voltage information or machine terminal current information. Techniques for utilizing back EMF to compute motor shaft position at high speeds are known in the art and will not be discussed further.

High frequency injection (HFI) algorithm 135 is a software application that estimates rotor position during low-speed operations. In one embodiment, HFI algorithm 135 is located within memory included in processor 120. In another embodiment, HFI algorithm 135 is located within memory located elsewhere within motor drive controller 110 circuitry. HFI algorithm 135 allows processor 120 to compute motor shaft position at low speeds using machine terminal information, such as, for example machine terminal voltage information or machine terminal current information. Techniques for utilizing HFI to compute motor shaft position at low speeds are known in the art and will not be discussed further.

Processor control algorithm 140 is a software application that provides a set of routines that allows processor 120 to interface with various hardware devices as well as control internal processing within processor 120. Processor control algorithm 140 is executed by processor 120. Processor control algorithm 140 provides processor 120 with an inverter switching frequency that determines processor execution time of processor 120. In one embodiment, processor control algorithm 140 is located within memory included in processor 120. In another embodiment, processor control algorithm 140 is located within memory located elsewhere within motor drive controller 110 circuitry. In yet another embodiment and described in FIG. 2 below, processor control algorithm 140 is located elsewhere within motor drive system 100. Processor control algorithm 140 may be implemented as a stand alone algorithm or as part of a larger algorithm, such as, for example as part of a basic input/output system (BIOS) or as part of an operating system (OS). In one embodiment, processor control algorithm 140 modifies the rate at which processor 120 interrupts other processing to process instructions related to sensorless control algorithm 130.

Power inverter 150 includes a control input terminal (CTL2). In one embodiment, control input terminal (CTL2) of power inverter 150 is coupled to control output terminal (CTL1) of processor 120. Power inverter 150 is in communication with processor 120. In another embodiment, control input terminal (CTL2) of power inverter 150 is coupled to motor drive controller 110, and power inverter 150 is in communication with processor 120 via motor drive controller 110. Power inverter 150 may include additional components or terminals not relevant to the present discussion. Power inverter 150 provides a pulse-width modulated (PWM) power signal to the motor (not shown) based on a pulse-width modulated control signal received from processor 120.

In operation, processor 120 receives machine terminal information and computes motor shaft position based on an estimation of rotor position utilizing sensorless control algorithm 130. Estimation of rotor position provides a means for determination of motor speed. During high-speed operations (e.g. motor speed above 6000 revolutions/minute), estimation of rotor position is conducted utilizing back electromotive force (EMF) algorithm 132. During low-speed operations (e.g. motor speed below 3000 revolutions/minute), estimation of rotor position is conducted utilizing high frequency injection (HFI) algorithm 135 in addition to EMF algorithm 132. When estimation of rotor position is conducted at low-speed, processor 120 instructs processor control algorithm 140 to increase processor execution time by decreasing inverter switching frequency provided to processor 120. During a transition between low-speed operations and high-speed operations (e.g., between motor speeds of 3000 revolutions/minute and 6000 revolutions/minute) estimation of rotor position is conducted utilizing high frequency injection (HFI) algorithm 135 in addition to EMF algorithm 132 as well. When estimation of rotor position is conducted within this transition area, processor 120 instructs processor control algorithm 140 to increase/decrease processor execution time by decreasing/increasing inverter switching frequency provided to processor 120 to achieve a variable processor execution time. Determination of processor execution time is detailed in FIG. 3, below.

A return to higher motor speeds results in a return to back EMF algorithm 132 for estimation of rotor position and disabling of HFI algorithm 135. When estimation of rotor position is conducted at high-speed, processor 120 instructs processor control algorithm 140 to decrease processor execution time by increasing inverter switching frequency provided to processor 120. The choice of switching frequencies can be modified by system considerations including power losses, audible noise, and peak ripple current.

Figure 2:
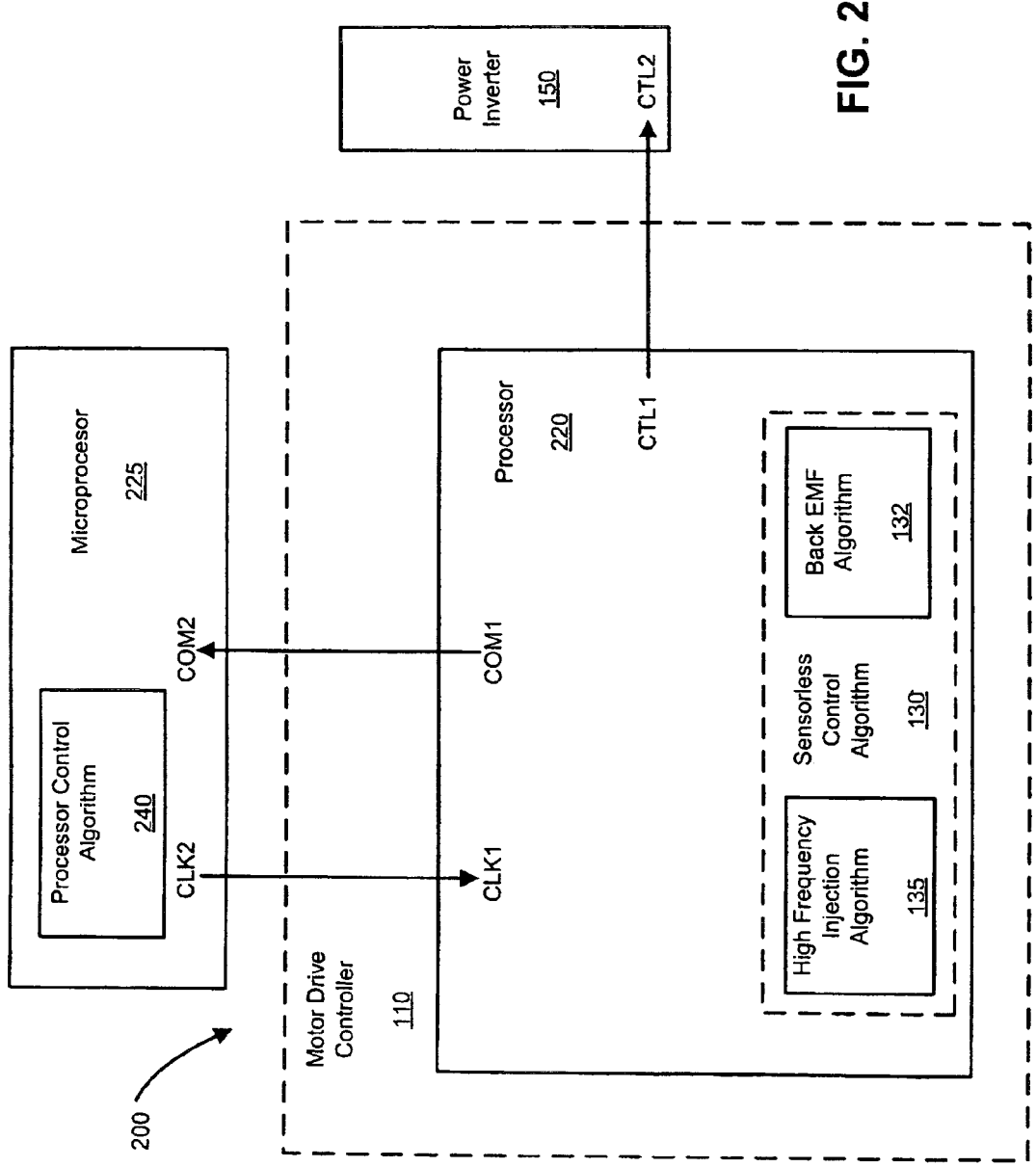
FIG. 2 is a block diagram illustrating a motor drive controller, according to another embodiment of the present invention.

FIG. 2 is a block diagram illustrating a motor drive system 200 including motor drive controller 110, power inverter 150, and microprocessor 225. Controller 210 includes processor 220. Processor 220 includes sensorless control algorithm 130. Sensorless control algorithm 130 includes back electromotive force (EMF) algorithm 132 and high frequency injection algorithm 135. Microprocessor 225 includes processor control algorithm 240. Identically named and numbered components from FIG. 1 function as described above. Motor drive system 200 may include additional components not relevant to the present discussion.

Processor 220 further includes a control output terminal (CTL1), a communication output terminal (COM1), and a clock input terminal (CLK1). In another embodiment, the functionality of communication output terminal (COM1) and clock input terminal (CLK1) of processor 220 are performed by a single signal input/output terminal. Processor 220 may include additional components or terminals not relevant to the present discussion. Processor 220 is capable of processing different algorithms at different clock rates, for example based on an inverter switching frequency. Processor 220 may be implemented as any suitable processor, such as, for example a 40 megahertz (MH) Black Oak processor available from Motorola, Inc. of Schaumburg, Ill.

Microprocessor 225 further includes a communication input terminal (COM2) and a clock output terminal (CLK2). In another embodiment, the functionality of communication input terminal (COM2) and clock output terminal (CLK2) of microprocessor 225 are performed by a single signal input/output terminal. Communication output terminal (COM1) of processor 220 is coupled to communication input terminal (COM2) of microprocessor 225, and clock input terminal (CLK1) of processor 220 is coupled to clock output terminal (CLK2) of microprocessor 225. Microprocessor 225 may include additional components or terminals not relevant to the present discussion. Microprocessor 225 may be implemented as any suitable microprocessor.

Processor control algorithm 240 is a software application that provides a set of routines that allows microprocessor 225 to interface with various hardware devices. Processor control algorithm 240 is in communication with processor 220 and provides processor 220 with an inverter switching frequency that determines processor execution time of processor 220. In one embodiment, processor control algorithm 240 is located within memory included in microprocessor 225. Processor control algorithm 240 may be implemented as a stand alone algorithm or as part of a larger algorithm, such as, for example as part of a basic input/output system (BIOS) or as part of an operating system (OS).

In operation, processor 220 receives machine terminal information and computes motor shaft position based on an estimation of rotor position utilizing sensorless control algorithm 130. Estimation of rotor position provides a means for determination of motor speed. During high-speed operations, estimation of rotor position is conducted utilizing back electromotive force (EMF) algorithm 132. During low-speed operations, estimation of rotor position is conducted utilizing high frequency injection (HFI) algorithm 135 in addition to EMF algorithm 132. When estimation of rotor position is conducted at low-speed, processor 220 instructs processor control algorithm 240 within microprocessor 225 to increase processor execution time of processor 220 by decreasing inverter switching frequency provided to processor 220.

A return to higher motor speeds results in a return to back EMF algorithm 132 for estimation of rotor position and disabling of HFI algorithm 135. When estimation of rotor position is conducted at high-speed, processor 220 instructs processor control algorithm 240 within microprocessor 225 to decrease processor execution time of processor 220 by increasing inverter switching frequency provided to processor 220. In one embodiment, the choice of switching frequencies is determined by system considerations including power losses, audible noise, peak ripple current, and the like.

Figure 3:
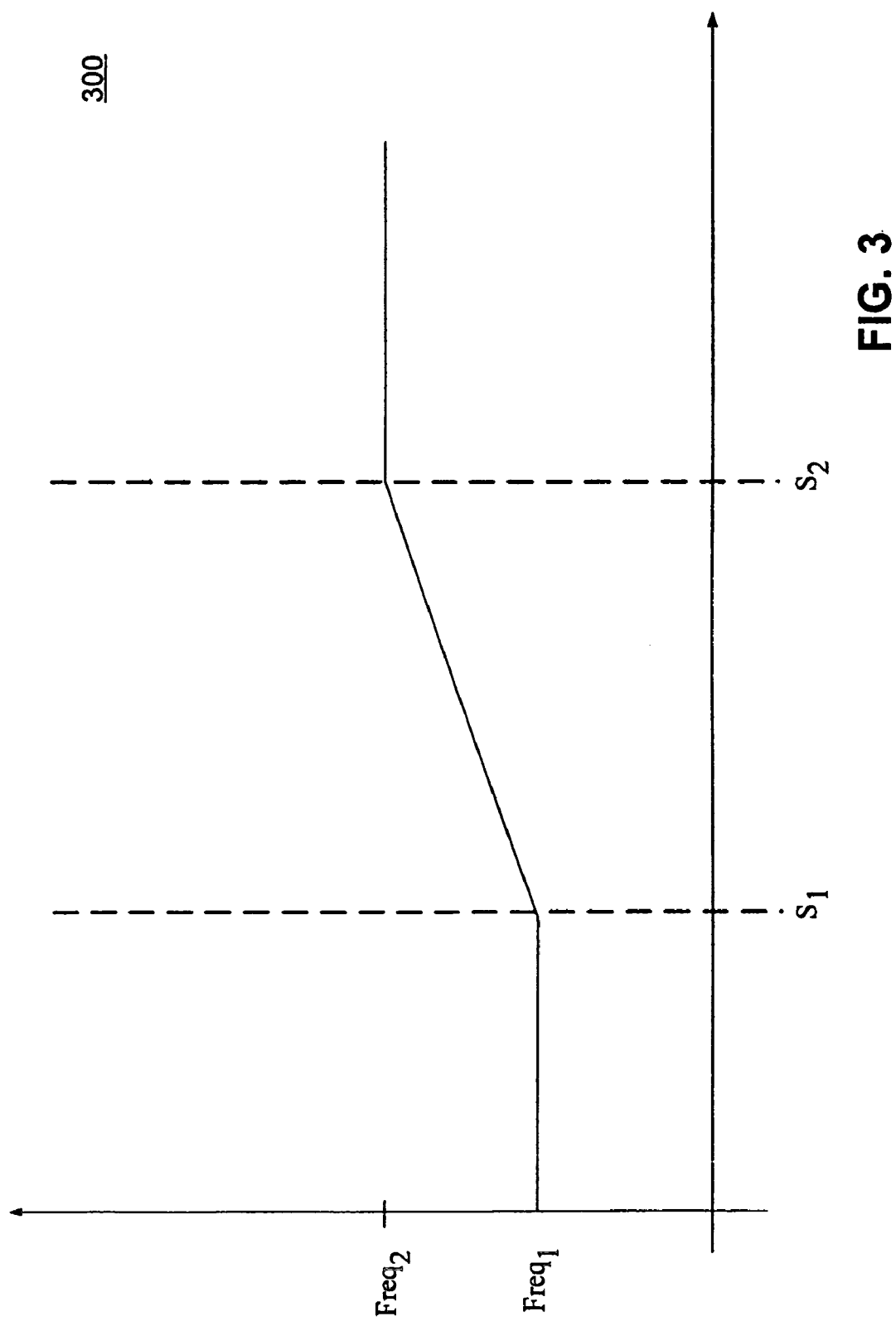
FIG. 3 is a graph illustrating inverter switching frequency versus motor speed, according to an embodiment of the present invention.

FIG. 3 is a graph illustrating inverter switching frequency versus motor speed. In FIG. 3, the x-axis represents absolute motor speed and the y-axis represents inverter switching frequency. In one embodiment and referring to FIGS. 1 and 2 above, the y-axis represents an inverter switching frequency supplied to a processor (120, 130) by a processor control algorithm (140, 240) based on a motor speed determination utilizing sensorless control algorithm 130.

FIG. 3 additionally includes motor speeds ($S_1$ and $S_2$) and associated inverter switching frequencies ($Freq_1$ and $Freq_2$) provided for illustrative purposes. Motor speeds ($S_1$ and $S_2$) define three regions. In one embodiment, one region is defined as including motor speeds that are less than motor speed $S_1$. A second region is defined as including motor speeds that lie between motor speeds ($S_1$ and $S_2$). A third region is defined as including motor speeds that are greater than motor speed $S_2$. In this embodiment, each motor speed region has a corresponding frequency or range of frequencies associated with it. In other embodiments, the graph may include non-linear portions within one or more regions, such as, for example within the second region that includes motor speeds that lie between motor speeds ($S_1$ and $S_2$).

In an example, for motor speeds exceeding motor speed $S_2$ (e.g. 6000 revolutions per minute) inverter switching frequency $Freq_2$ is provided to the processor. For motor speeds less than motor speed $S_1$ (e.g. 3000 revolutions per minute) inverter switching frequency $Freq_1$ is provided to the processor. When the determined motor speed lies in the region defined between motor speeds ($S_1$ and $S_2$), a variable inverter switching frequency is provided to the processor based on the slope of the line between motor speeds ($S_1$ and $S_2$). In one embodiment, the slope of the line is defined as:

$$Freq=\{[(S-S_1)/(S_2-S_1)]*Freq_1\}+Freq_1$$

where S is a motor speed between motor speeds ($S_1$ and $S_2$).

In operation and referring to FIGS. 1 and 2 above, when the processor receives machine terminal information and determines a motor speed exceeding motor speed $S_2$, such as, for example utilizing back electromotive force (EMF) algorithm, inverter switching frequency $Freq_2$ is provided to the processor. In an example, when the processor determines a motor speed exceeding motor speed $S_2$, an inverter switching frequency of 10 kilohertz (KHz) is provided to the processor. The 10 kHz inverter switching frequency allows the processor to perform all calculations within 100 microseconds ($\mu S$) when synchronous pulse-width modulation (PWM) is used.

When the processor receives machine terminal information and determines a motor speed less than motor speed $S_1$, such as, for example utilizing back electromotive force (EMF) algorithm and high frequency injection (HFI) algorithm, inverter switching frequency $Freq_1$ is provided to the processor. In an example, when the processor determines a motor speed less than motor speed $S_1$, an inverter switching frequency of 5 kilohertz (KHz) is provided to the processor. The 5 kHz inverter switching frequency allows the processor to perform all calculations within 200 microseconds ($\mu S$) when synchronous pulse-width modulation (PWM) is used. The additional processing time allows the processor to execute both algorithms (back EMF and HFI).

When the processor receives machine terminal information and determines a motor speed that lies in the region defined between motor speeds ($S_1$ and $S_2$), the HFI algorithm is deactivated and an inverter switching frequency is determined based on the slope of the line between motor speeds ($S_1$ and $S_2$). In an example, when the determines a motor speed that lies in the region defined between motor speeds ($S_1$ and $S_2$), the HFI algorithm is deactivated and an inverter switching frequency between 5 KHz and 10 KHz is provided to the processor.

Figure 4:
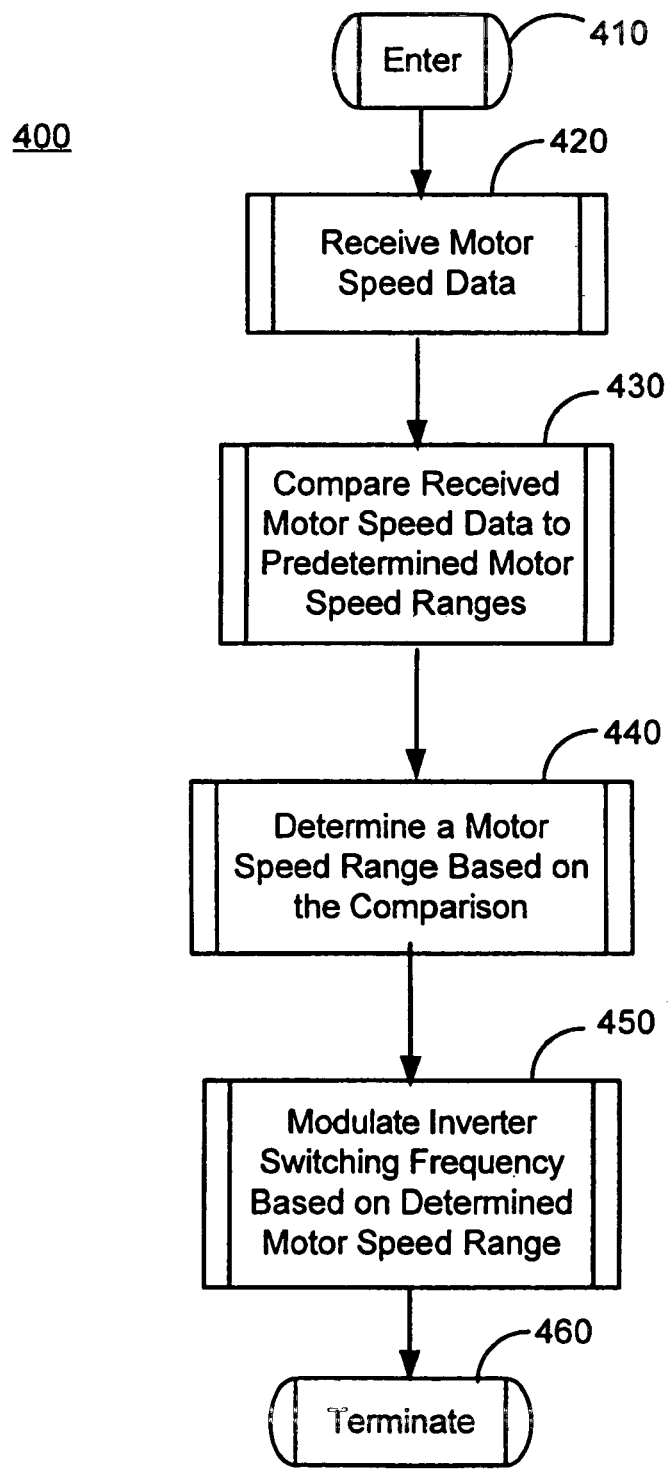
FIG. 4 is a flow diagram illustrating a method for managing processor execution time utilizing variable frequency switching, according to an embodiment of the present invention.

FIG. 4 is a flow diagram depicting an exemplary embodiment of code on a computer readable medium in accordance with the present invention. FIG. 4 details an embodiment of a method 400 for managing processor execution time utilizing variable frequency switching. Method 400 may utilize one or more concepts detailed in FIGS. 1–3, above.

Method 400 begins at block 410. At block 420, motor speed data is received. In one embodiment, a processor receives machine terminal information and determines motor speed data based on the machine terminal information. In an example, processor 120 receives machine terminal current or machine terminal voltage and determines motor speed data based on the received machine terminal information. In another embodiment, a processor receives machine terminal information and processes the motor speed data utilizing a back electromotive force (EMF) method or a combination of the EMF method and a high frequency injection method.

At block 430, the received motor speed data is compared to predetermined motor speed ranges. In one embodiment, the predetermined motor speed ranges are defined by specific motor speeds. In an example, the motor speeds are manufacturer determined motor speeds. In this example, the motor speed ranges are manufacturer determined motor speed ranges. At block 440, a motor speed range that includes the motor speed data is determined based on the comparison in block 430. In one embodiment, the motor speed range is determined as described in FIG. 3 above.

At block 450, inverter switching frequency is modulated based on the determined motor speed range of block 440. In one embodiment, the inverter switching frequency is modulated by determining a modified inverter switching frequency value based on the determined motor speed range and providing the modified inverter switching frequency value to a processor control algorithm. In this embodiment, a processor control algorithm modifies the inverter switching frequency based on the modified inverter switching frequency value. The processor control algorithm may be implemented as an operating system or as a BIOS.

In an example and referring to FIG. 3, modulating the inverter switching frequency of the processor includes assigning a first inverter switching frequency when the received motor speed data is within a first motor speed range, providing a variable inverter switching frequency when the received motor speed data is within a second motor speed range, and providing a second inverter switching frequency when the received motor speed data is within a second motor speed range. Determining the inverter switching frequency may also include system considerations, such as, for example power losses, audible noise, peak ripple current, and the like. The above method allows the use of lower cost processors and may provide growth for additional software features.

The above-described system and method for managing processor execution time in a motor controller is an example system and method. The system and method for managing processor execution time in a motor controller illustrates one possible approach for managing processor execution time in a motor controller. The actual implementation may vary from the package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

What is claimed is:

1. A method of managing processor execution time in a motor controller, the method comprising:
   receiving motor speed data;
   comparing the received motor speed data to predetermined motor speed ranges;
   determining a motor speed range based on the comparison; and
   increasing or decreasing a processor execution time by increasing or decreasing an inverter switching frequency of a motor controller processor based on the determined motor speed range.

2. The method of claim 1, wherein receiving the motor speed data comprises:
   receiving machine terminal information;
   processing the received machine terminal information; and
   determining motor speed data based on the processed machine terminal information.

3. The method of claim 2, wherein the machine terminal information is selected from the group consisting of: machine terminal current and machine terminal voltage.

4. The method of claim 2, wherein processing the received information utilizes a method selected from the group consisting of: back electromotive force method and high frequency injection method.

5. The method of claim 1, wherein the predetermined motor speed ranges are manufacturer determined motor speed ranges.

6. The method of claim 1, wherein modulating the inverter switching frequency of the motor control processor comprises:
   determining a modified inverter switching frequency value based on the determined motor speed range; and
   providing the modified inverter switching frequency value to a processor control algorithm;
   wherein the processor control algorithm modifies the inverter switching frequency based on the modified inverter switching frequency value.

7. The method of claim 6, wherein the processor control algorithm is selected from the group consisting of: an operating system and a BIOS.

8. The method of claim 6, further comprising:
   providing a first inverter switching frequency when the received motor speed data is within a first motor speed range;
   providing a variable inverter switching frequency when the received motor speed data is within a second motor speed range; and
   providing a second inverter switching frequency when the received motor speed data is within a second motor speed range.

9. A system for managing processor execution time in a motor controller, the system comprising:
   means for receiving motor speed data;
   means for comparing the received motor speed data to predetermined motor speed ranges;
   means for determining a motor speed range based on the comparison; and
   means for increasing or decreasing a processor execution time by increasing or decreasing an inverter switching frequency of the motor control processor based on the determined motor speed range.

* * * * *